United States Patent [19]

Suzuki et al.

[11] Patent Number: 4,674,084

[45] Date of Patent: Jun. 16, 1987

[54] NETWORK SYSTEM

[75] Inventors: Tadashi Suzuki, Yokohama; Toru Futami; Atsushi Sakagami, both of Yokosuka, all of Japan

[73] Assignee: Nissan Motor Company, Limited, Japan

[21] Appl. No.: 758,796

[22] Filed: Jul. 25, 1985

[30] Foreign Application Priority Data

Jul. 27, 1984 [JP] Japan ............................... 59-156759

[51] Int. Cl.[4] ................................................ H04J 3/06

[52] U.S. Cl. ....................................... 370/85; 370/100

[58] Field of Search ...................... 370/85, 100, 110.4; 340/825.5; 375/113

[56] References Cited

U.S. PATENT DOCUMENTS

| | | | |
|---|---|---|---|
| 3,938,144 | 2/1976 | Pederson et al. . | |
| 4,205,200 | 5/1980 | Parikh et al. . | |
| 4,227,178 | 10/1980 | Gergaud et al. ..................... | 370/85 |
| 4,386,426 | 5/1983 | Pugh ................................... | 370/85 |
| 4,484,190 | 11/1984 | Bedard . | |
| 4,538,262 | 8/1985 | Sinniger .............................. | 370/85 |
| 4,580,261 | 4/1986 | Pelotte ................................ | 370/85 |

FOREIGN PATENT DOCUMENTS

| | | |
|---|---|---|
| 1096403 | 12/1967 | United Kingdom . |
| 1287334 | 8/1972 | United Kingdom . |
| 1298190 | 11/1972 | United Kingdom . |
| 1427133 | 3/1976 | United Kingdom . |
| 1462052 | 1/1977 | United Kingdom . |
| 1494240 | 12/1977 | United Kingdom . |
| 2041592A | 9/1980 | United Kingdom . |

OTHER PUBLICATIONS

Ein byteserielles bitparalleles Schnittstellensystem fur programmierban mebgerate-DIN IEC 625 Teil 1 Mai 1981.

Wie funktioniert der IEC-Bus?-Elektronik 1975.

Microprocessor Interfacing Techniques-ZAKS.

*Primary Examiner*—Douglas W. Olms
*Assistant Examiner*—Kenneth I. Rokoff
*Attorney, Agent, or Firm*—Lowe, Price, LeBlanc, Becker & Shur

[57] ABSTRACT

A network system having a single-wire common signal transmission line for interfacing a serial bit data string between a plurality of data stations connected thereto comprises: (a) first means for repeatedly generating an address information bit signal based on a predetermined time series code for each predetermined synchronization timing, modulating each address information bit signal into a synchronous signal having a frequency which is varied according to a bit status of each address information bit signal, and outputting the modulated synchronous signal to the common signal transmission line so as to superpose on the serial bit data string, (b) second means provided within each station for demodulating the synchronous signal derived from said first means according to the frequency thereof so as to extract the bit status of the address information bit signal, (c) third means provided within each station for reproducing a signal corresponding to the predetermined time series code generated in said first means on the basis of the extracted bit status of the address information bit signal, (d) fourth means for discriminating each bit combination pattern of a predetermined data length from the reproduced signal of said third means, and (f) fifth means for determining an operation mode of the station on the basis of each bit combination pattern discriminated by said fourth means.

9 Claims, 11 Drawing Figures

FIG. 1 (PRIOR ART)
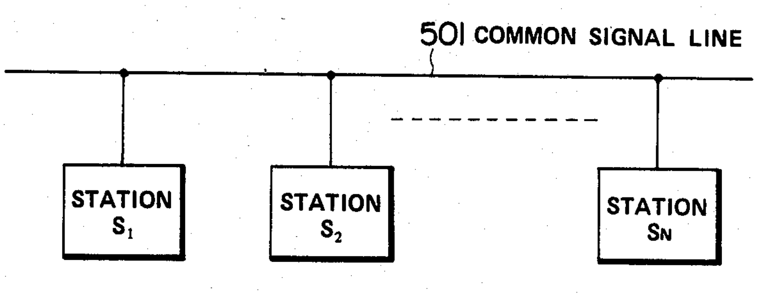
FIG. 2 (PRIOR ART)
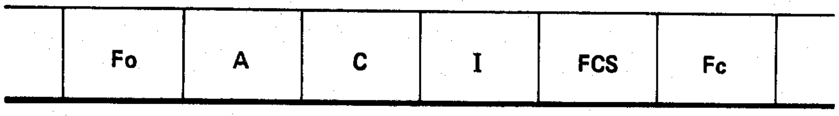
FIG. 4 (PRIOR ART)
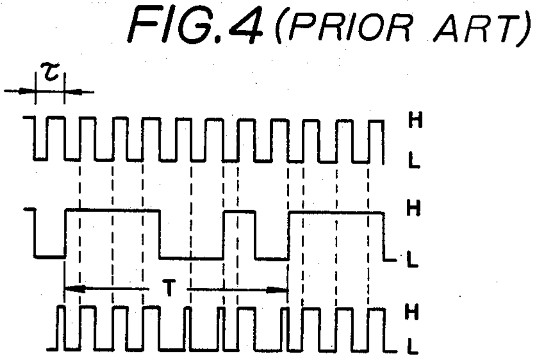
FIG. 5 (PRIOR ART)
τ →
| | (6) | (7) | 1 | 2 | 3 | 4 | 5 | 6 | 7 | (1) |
|---|---|---|---|---|---|---|---|---|---|---|
| D1 ---- | H | H | H | L | L | H | L | H | H | H ---- |
| D2 ---- | L | H | H | H | L | L | H | L | H | H ---- |
| D3 ---- | H | L | H | H | H | L | L | H | L | H ---- |
| X --- | L | H | L | L | L | L | L | L | H | L --- |
|← T →| (spanning columns 1 to 7)

NETWORK SYSTEM

BACKGROUND OF THE INVENTION

The present invention relates generally to a network system in which a plurality of data stations are connected to a common signal line, the common signal line providing a means for transferring a serial (bit-serial) data between each data station and more particularly to the network system in which the transmission and reception of such serial data between the mutually addressed data stations are controlled on the basis of a synchronous signal generated and outputted on the single-wire common signal line.

FIG. 1 shows a conventional network system.

In FIG. 1, a single common signal line 501 is provided for connecting a plurality of stations $S_1, S_2, \ldots, S_N$. A format of a signal communicating with each station $S_1$, $S_2$, $S_N$ is a string (bit serial) as shown in FIG. 2. Such a signal format is called SDLC (Synchronous Data Link Communication) developed by IBM corporation. In this signal format shown in FIG. 2, [Fo] and [Fc] have a bit pattern of "01111110" indicating the start and end of the data string. In FIG. 2, [A] comprises normally eight serial bits and indicates a destination address to which a transfer data [I] is sent. In FIG. 2, [C] comprises normally eight serial bits and indicates a kind of the data [I]. In addition, [FCS] is provided for detecting an error in the data [I] generated during the transmission of the data [I].

In the SDLC format, however, the destination address [A] is indespensable for synchronization of data transmission and reception the data needs to be transferred in a single signal line 501 as well as [Fo] and [Fc]. Therefore, there is a problem in that since more time is required for transmitting such information bits as [Fo], [Fc], and [A] in addition to the time for the data [I], transmission efficiency of data is accordingly reduced.

To cope with such a transmission efficiency problem, a two-wire type network system has been proposed in which data string signal and address signal are sent on their separately used signal lines. In this network system, a predetermined code string signal is sent to each station via an exclusive synchronous signal transmission line so that addressing (selection of two data stations mutually communicated) and synchronization are taken with the code string signal for each station. This is exemplified by Japanese Patent Examined Open No. Sho. 52-13,367 tilted to a system for transmitting multiplex signals published on Apr. 14, 1977.

The disclosed network system shown in FIG. 3 comprises a plurality of pair of transmission station 704 and reception station 705 are connected mutually via the synchronous signal transmission line 702 and data transmission line 703. Such a synchronous signal as shown in (c) of FIG. 4 is sent to each station from a synchronous signal generator 701 via the synchronous signal line 702.

In the synchronous signal generator 701, a clock signal having a constant signal $\tau$ as shown in (a) of FIG. 4 and an M-series code repeating such an order as "H", "H", "H" "L", "L", "H", and "L" for a constant period T as shown in FIG. (b) of 4 are generated. The synchronous signal generator 701, furthermore, modulates the generated M-series code in a pulsewidth modulation manner so that such the synchronous signal as shown in (c) of FIG. 4 is outputted to the synchronous signal line 701.

As shown in FIG. 3, the transmission station 704 comprises: (a) a receiving circuit 706 which receives and demodulates the synchronous signal into the clock signal and original series code signal as shown in (a) and (b) of FIG. 4; (b) three-stage shift registers 707, 708, and 709 which shift sequentially the demodulated code series signal in synchronization with the clock signal derived from the receiving circuit 706; (c) a logic circuit 710 which enables a gate 711 to open when a logic operation of each output signal level of these shift registers 707, 708, and 709 is carried out and a predetermined logic result is established.

FIG. 5 shows a relationship between the outputs D1, D2, and D3 of the shift registers (S.R.) 707, 708, and 709 and output logic status X of the logic circuit 710 for each clock signal generation.

As shown in FIG. 5, a combination pattern of "L" and "H" of the output signals of the shift registers 707, 708, and 709 appears seven kinds separately for a period T of the code series signal.

Hence, if one of the seven kinds of combination patterns in each transmission station 704 is a condition of establishment in the logic circuit 710 (for example, "H", "H", and "L" as shown in FIG. 5), the logic condition of the logic circuit 710 is established once for a period T of the code series signal so that the gate 711 is enabled to open. Consequently, one bit constituting the serial data is sent from an output circuit 712 to the data transmission line 703 during the period T.

On the other hand, the reception station 705 comprises the reception circuit 713, three-stage shift registers (S.R.) 714, 715, and 716 and logic circuit 717. The gate 718 is enabled to open only when the predetermined combination is established for one period T of the series code signal so that one bit constituting the serial data is fetched into a signal input circuit 719 from the data transmission line 703 via the gate 718.

In this way, any one of the transmission stations 704 can transmit data with any one of the reception stations 705 which has a logic circuit 717 having the same logic establishment condition as that of the logic circuit 710 via the line 703. In addition, the transmission station 704 can take different synchronization with the other transmission/reception stations having other logic establishment conditions so that data transfer is made without collision of data.

However, since the synchronous signal line 702 and serial data signal line 703 are exclusively used in the disclosed two-wire type network system, the number of signal lines and the number of repeater and connectors usually increase so that the construction of the network system becomes complex, large-sized, and requires large expenditure.

SUMMARY OF THE INVENTION

With the above-described problem in mind, it is an object of the present invention to provide a network system in which a construction of the whole network system is simplified and its manufacturing cost is reduced, with the transmission efficiency appropriately maintained. The above-described object can be achieved by providing a network system, comprising: (a) a single-wire common signal transmission line for transferring a serial bit data string between a plurality of data stations connected thereto, (b) first means for repeatedly generating an address information bit signal based on a predetermined time series code for each predetermined synchronization timing, modulating each address information bit signal into a synchronous signal having a frequency which is varied according to a bit status of each address information bit signal, and outputting the modulated synchronous signal to the common signal transmission line so as to superpose on the serial bit data string, (c) second means provided within each station for demodulating the synchronous signal derived from the first means according to the frequency thereof so as to extract the bit status of the address information bit signal, (d) third means provided within each station for reproducing a signal corresponding to the predetermined time series code generated in the first means on the basis of the extracted bit status of the address information bit signal, (e) fourth means for discriminating each bit combination pattern of a predetermined data length from the reproduced signal of the third means, and (f) fifth means for determining an operation mode of the station on the basis of each bit combination pattern discriminated by the fourth means.

BRIEF DESCRIPTION OF THE DRAWINGS

A more complete understanding of the present invention may be obtained from the foregoing description taken in conjunction with the attached drawings in which like reference numerals designate corresponding elements and in which:

FIG. 1 is a simplified block diagram of a conventional network system;

FIG. 2 is a format of a information signal used in the conventional network system shown in FIG. 1;

FIG. 4 is a timing chart for three for explaining an operation of a synchronous signal generator in the network system shown in FIG. 3;

FIG. 5 is a logic state diagram for explaining logic status of an M-series synchronous code used in the network system shown in FIG. 3;

DESCRIPTION OF THE PREFERRED EMBODIMENT

Reference will be made to the attached drawings in order to facilitate understanding of the present invention.

Figure 3:
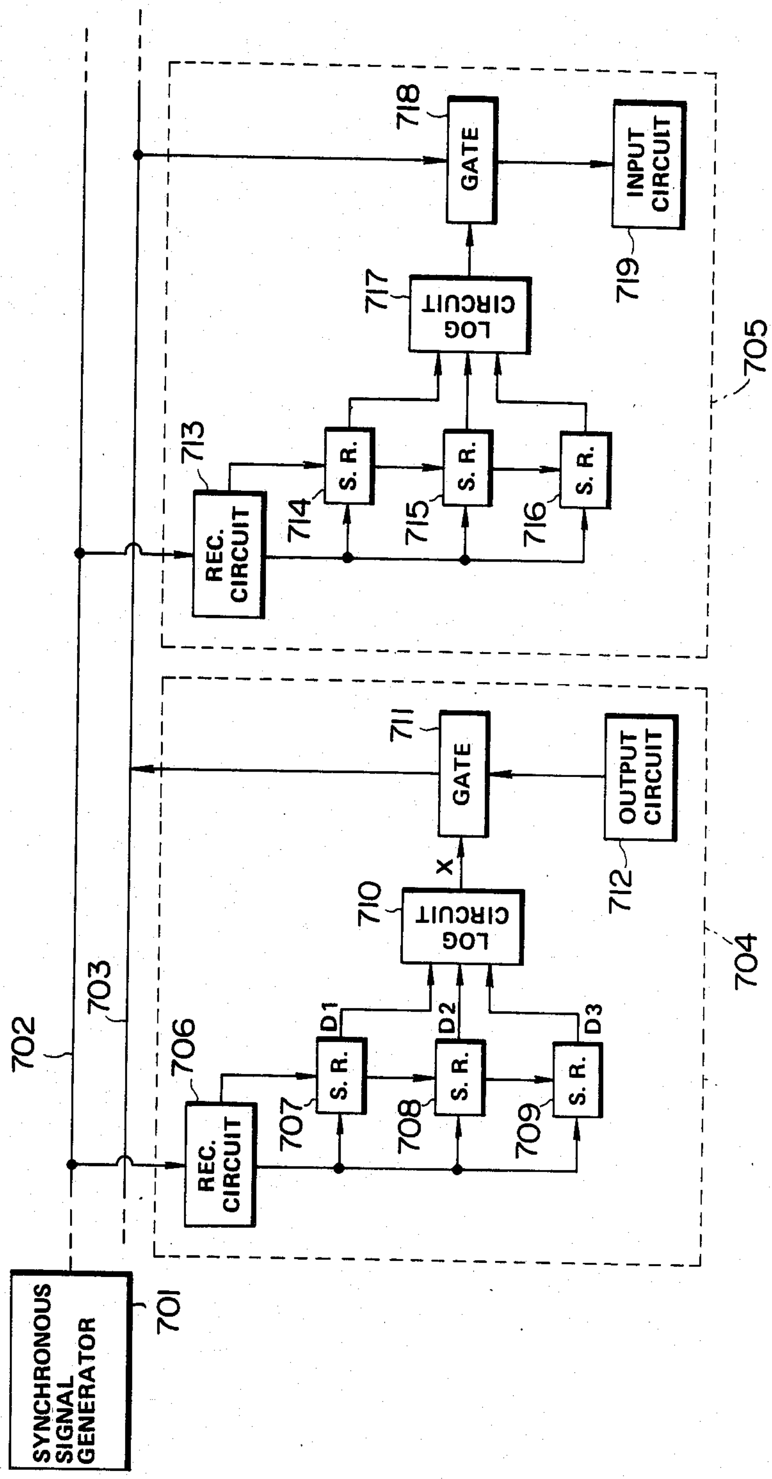
FIG.3 (PRIOR ART)
FIG. 3 is a simplified circuit block diagram of a conventional two-wire type network system disclosed in Japanese Patent Application Examined Open No. Sho 52-13,367.
Figure 6A:
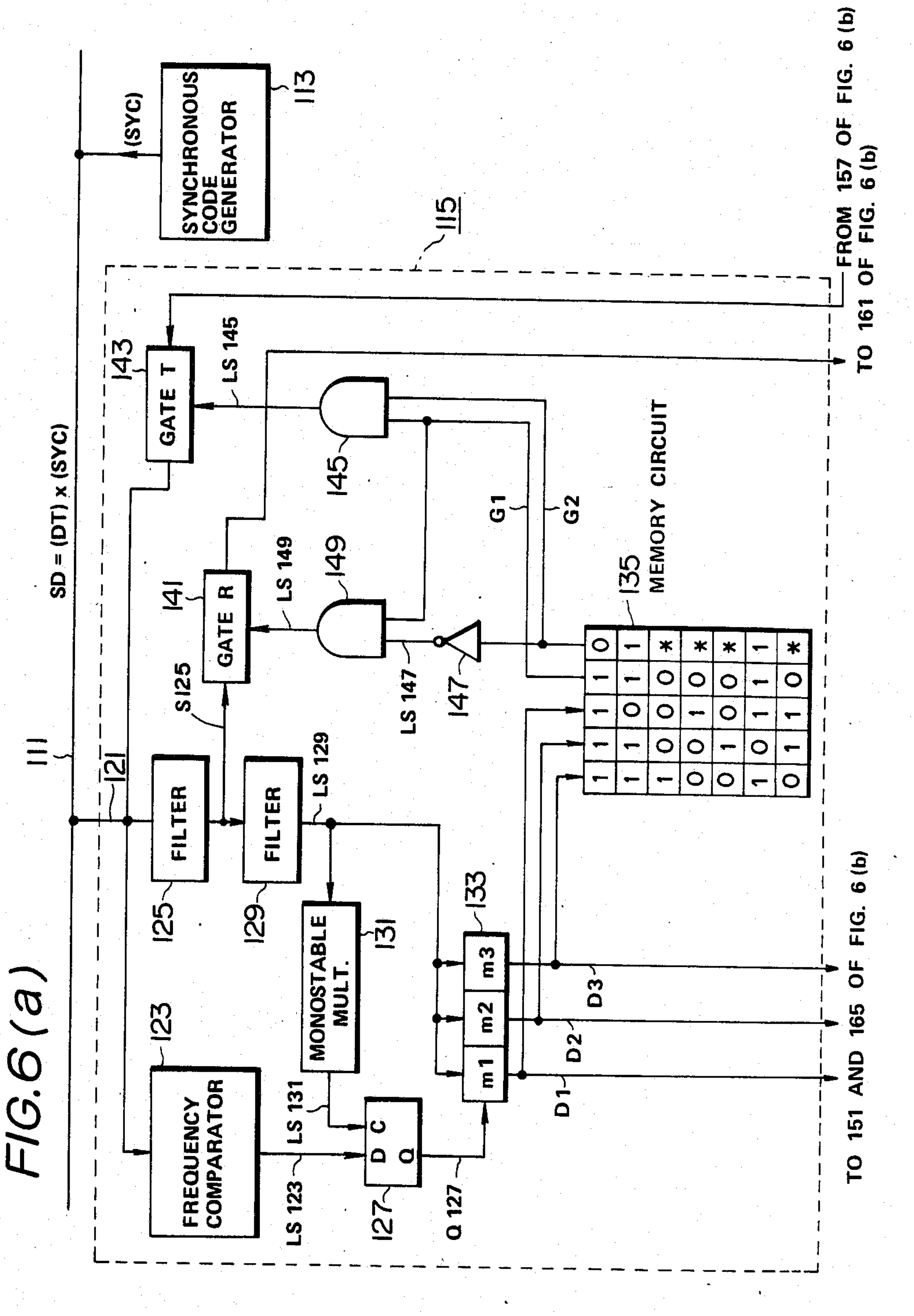
FIGS. 6(*a*) and 6(*b*) are integrally a circuit block diagrams of one of a plurality of stations constituting a network system and a synchronous code generator in a preferred embodiment.
Figure 6B:
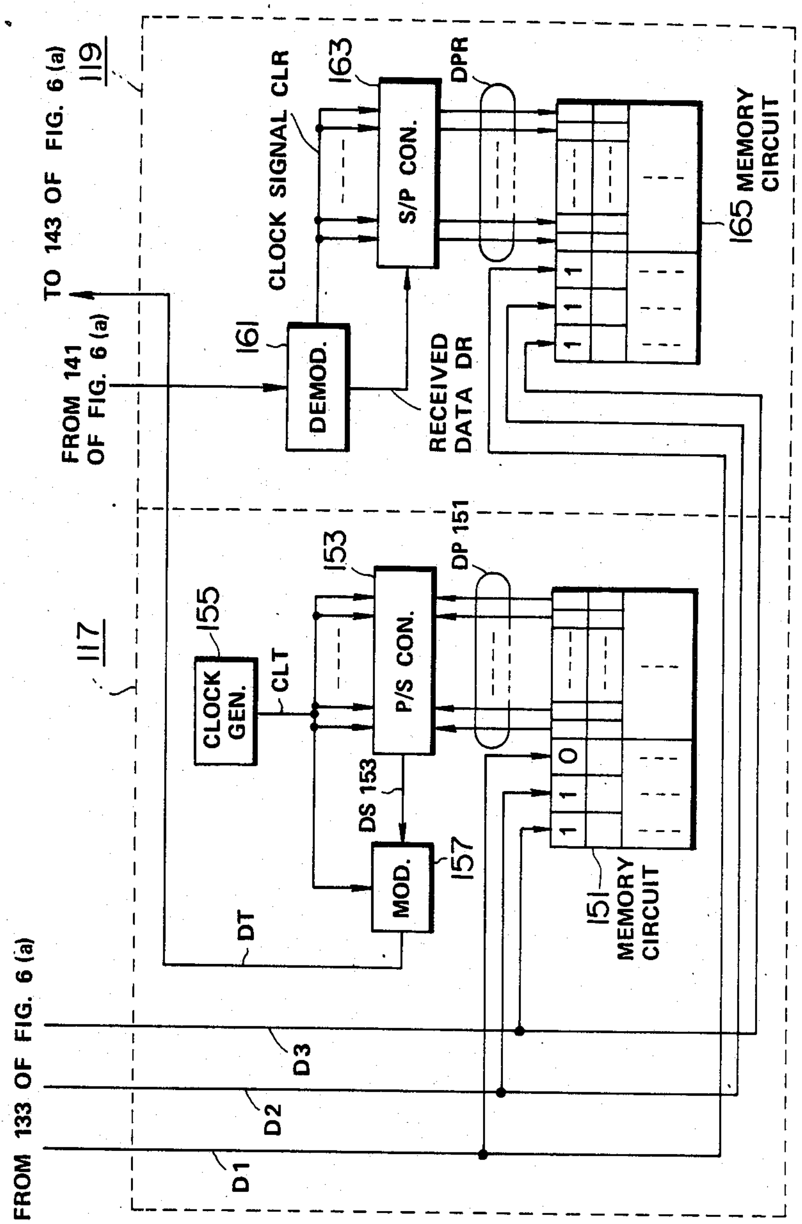

FIGS. 6(*a*) and 6(*b*) show integrally a preferred embodiment according to the present invention.

In FIGS. 6(*a*) and 6(*b*), one of a plurality of stations constituting the network system is connected to a single-wire single signal transmission line 111. The station except the data station shown in FIGS. 6(*a*) and 6(*b*) have the same constructions as that shown.

A synchronous code generator 113 for generating a synchronous signal on the basis of which the transmission and reception of a serial (bit-serial) data are carried out between the plurality of the associated stations is connected to a single signal transmission line 111. The synchronous code generator 113 controls synchronizations of data transmissions and issues addressing commands to select any two data stations between which the serial data are transmitted and received. Such a synchronous code generator 113 is, in addition, connected to the signal transmission line 111 independently of the plurality of data stations.

Figure 7:
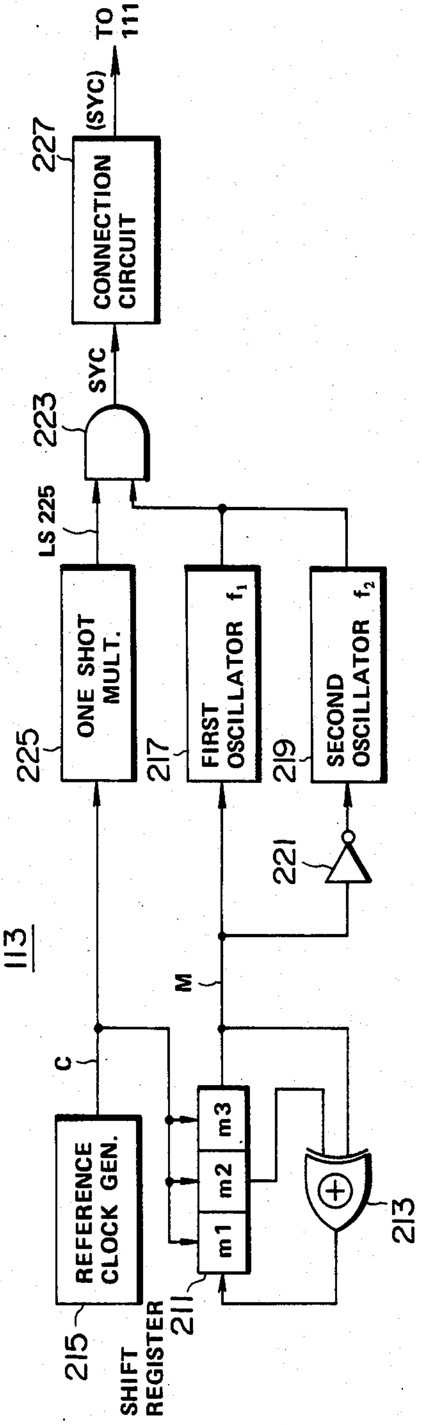
FIG. 7 is a simplified internal circuit block diagram of the synchronous code generator shown in FIG. 6(*a*)

FIG. 7 shows an internal circuit of the synchronous code generator 113.

The synchronous code generator 113, in this embodiment, generates a third-order M-series code string as a code string signal having a constant period.

Figure 8:
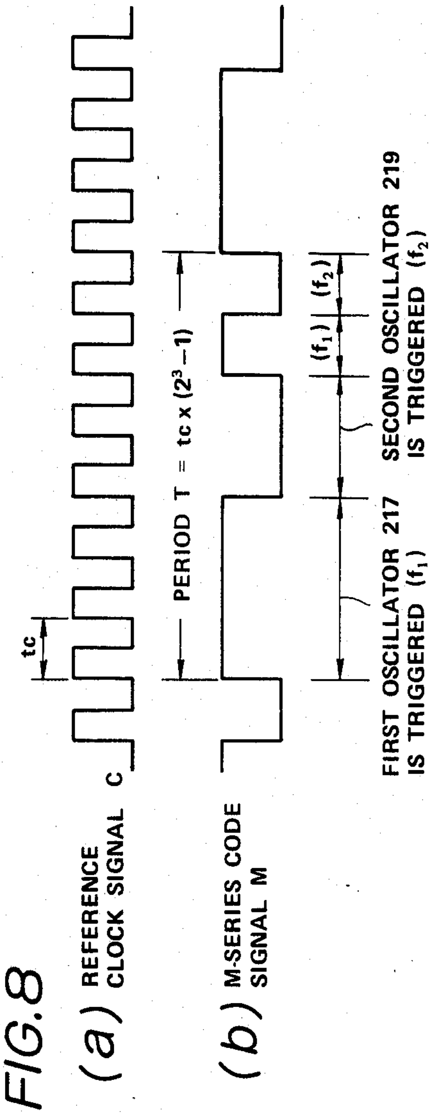
FIGS. 8(*a*) and 8(*b*) are a timing chart for two waveforms in respective circuits in the synchronous code generator shown in FIG. 7.

FIG. 8 is a signal waveform chart of an output signal in each part of the synchronous code generator 113 shown in FIG. 7.

In FIGS. 7, and 8 output signals of a second stage m2 and third stage m3 of the three stages of a shift register 211 are sent to an Exclusive-OR gate 213. An output signal of the Exclusive-OR gate 213 is inputted to a first stage m1 of the three stages of the shift register 211. A shift operation in the shift register 211 is controlled with a reference clock signal C sent from a reference clock signal generator 215. In this way, the M-series code generated by a combination between the shift register 211 and Exclusive-OR gate 213 is the third-order M-series code which accords with a polynomial expressions (m3 ⊕ m2) given by an exclusive OR between the output signals of the second stage m2 and third stage m3 of the shift register 211. It is already known that such an M series code is used as the synchronous signal. In general, a maximum period T of a code series achievable with n stages of the shift register and a logic element can be expressed as:

$$T = 2^n - 1 \quad (1)$$

Hence, a code status by the same combination takes a period expressed by the above equation (1) and is not generated during the period. If the synchronous signal which uses the M-series code is derived using a predetermined number of stages, the number of communication channels can most effectively be maximized. In this way, the M-series code is used extensively for the synchronous signal of the data transmission.

In the synchronous code generator 113 of the embodiment shown in FIG. 7, the number of stages in the shift register 211 is three.

The period T of the synchronous signal SYC based on the M series code is calculated as:

$$T = t_c \times (2^3 - 1),$$

wherein tc denotes the period of the reference clock.

The code combination status is seven kinds $(=2^3-1)$. For the M-series code, Japanese Patent Application Examined Open No. Sho. 52-13 ,367 published on Apr. 14, 1977 is disclosed, the contents of which is hereby incorporated by reference.

The synchronous code generator 113 further comprises two oscillators 117, 119 as shown in FIG. 7. The third-order M-series code signal M (refer to (b) of FIG. 8) derived from the output signal of the third stage m3 of the shift registers 211 is sent to an oscillation control terminal of the first oscillator 217 oscillating at a frequency $f_1$. In addition, the M-series code signal M is sent via an inverter 221 to an oscillation control terminal of the second oscillator 219 oscillating at a frequency $f_2$. When the M-series code signal M is at a "1", the first oscillator 217 is triggered. On the other hand, when the M-series code signal M is at a "0", the second oscillator 219 is triggered. It should be noted that the frequency $f_1$ is higher than the frequency $f_2$.

Either of the output signals of these oscillators 217, 219 is sent to an AND gate 223 selectively according to a logic state of the M-series code signal M. A monostable multivibrator 225 which receives reference clock signal C (refer to (a) of FIG. 8) and generates a signal LS225. That is to say, the multivibrator 225, responsive to a rising edge of the reference clock signal, outputs the signal LS225 which turns to a "0" for a time width $t_7$ to an AND gate 223.

The AND gate 223 takes a logical product of the output signal of either of the oscillators 217, 219 having the oscillation frequency of either $f_1$ or $f_2$ and logic signal LS225 derived from the monostable multivibrator 225. The output signal of the AND gate 223 is the synchronous signal SYC used in the network system according to the present invention. Furthermore, the synchronous signal SYC is sent to the signal transmission line 111 (refer to FIGS. 6(*a*) and 6(*b*)) via an electrical connection circuit 227 with a high/low impedance characteristic.

In this way, the logic states of "1" and "0" of the M-series code generated cyclically in accordance with the reference clock signal C are transformed into the synchronous signal SYC with different frequencies $f_1$ and $f_2$ according to the logic state of the M-series code M during each time slot defined by the reference clock C.

It should be noted that the electrical connection circuit 227 comprises, e.g., a diode and pull-up resistor so that the signal transmission line 111 can take a logical AND as expressed by SD=(DT)×(SYC) shown in FIG. 6(*a*) if the serial data DT is sent to the line 111.

Next, a construction of one of the plurality of data stations will be described below with reference to FIGS. 6(*a*) and 6(*b*). In addition, an operation of the network system according to the present invention will also be described below with reference to FIG. 9.

Both the synchronous code (SYC) derived from the M-series code and serial data (DT) are superposed with a logical AND therebetween on the signal transmission line 111. The data station shown in FIGS. 6(*a*) and 6(*b*) comprises a control block 115 for commanding the transmission or reception of the serial data string on the basis of addressing and synchronization by means of the synchronous code SYC generated by the synchronous code generator 113. The station comprises a transmission block 117 which transmits a serial data string stored therein according to a command from the control block 115.

Furthermore, the station includes a reception block 119 for introducing and storing the serial data string therein from a designated station via the signal transmission line 111 according to a command from the control block 115.

The signal input/output line 121 connected between the control block 115 and signal transmission line 111 is used to transfer the serial data string and synchronous signal in the station. The signal input/output line 121 is connected to a frequency comparator (for example, a window comparator comprising a filter) 123 for controlling either the transmission or reception of the serial data string. The output signal LS123 of the frequency comparator 123 is sent to an input terminal D of a latch circuit 127 comprising a D type flip-flop circuit. A filter 125 is connected to the signal input/output line 121 mainly for retrieving the serial data signal received from the signal transmission line 111 superposed with the synchronous signal SYC. The output signal S125 of the filter 125 is then sent to another filter 129. The subsequent stage of the filter 129 serves to cut off a frequency component exceeding $1/(t_B-t_L)$.

Figure 9:
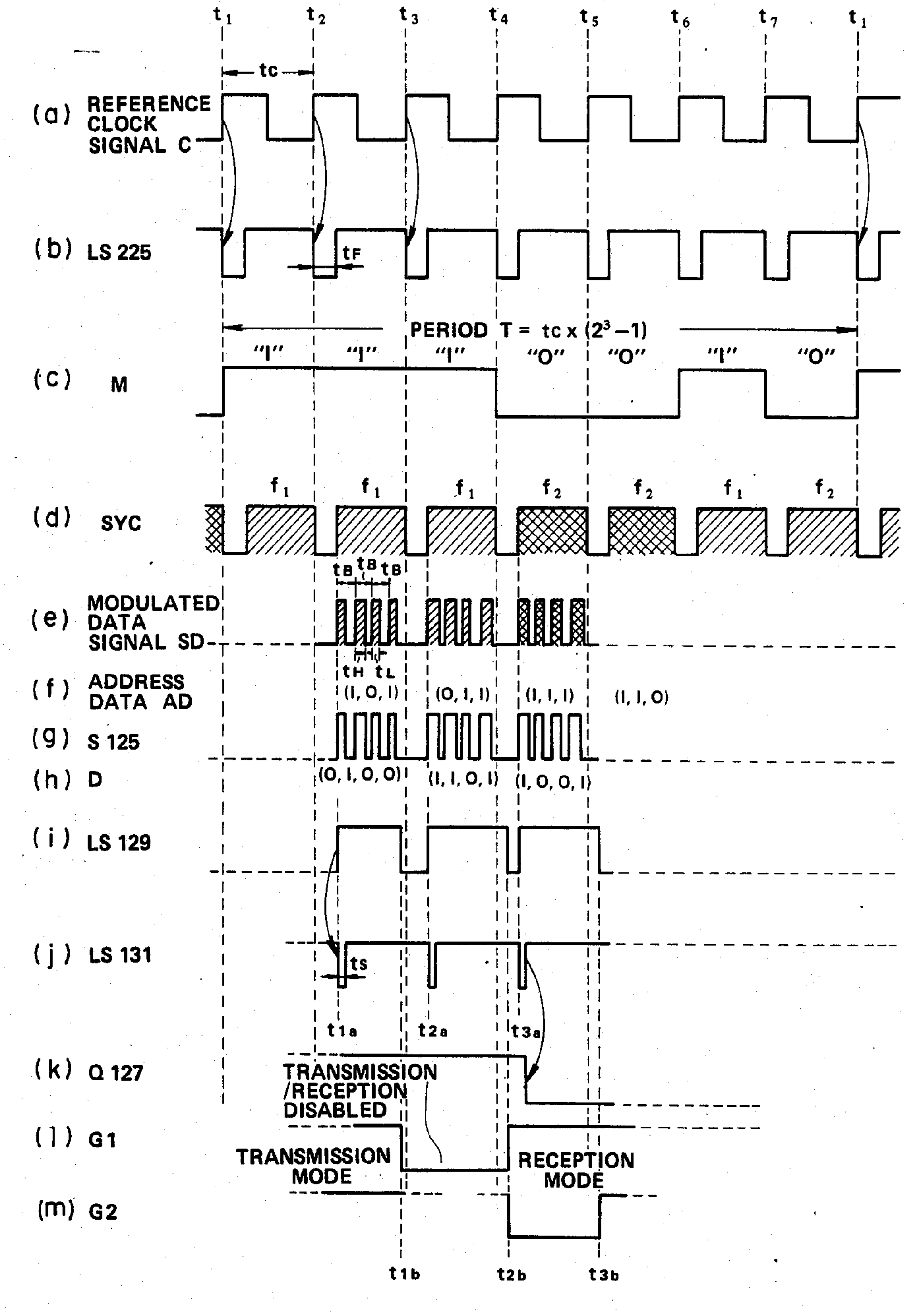
FIG. 9 is a timing chart for signal waveforms for explaining an operation of the preferred embodiment shown in FIGS. 6(*a*) and 6(*b*).

In this case, the time $t_B$ denotes a period within which one bit in the serial data string is transmitted and received in the network system irrespectively of its bit status and the time $t_L$ denotes a pulsewidth of a narrow pulse indicating a bit status of "0" in the serial data. Both filters 125 and 129 comprise, e.g., retriggerable mono-stable multivibrators. That is to say, the filter 125 outputs a pulse having a pulsewidth of $T_L$ whenever the modulated signal as shown in FIG. 9 is received. The filter 129 outputs a pulse having a pulsewidth of $t_H$ whenever the output signal from the filter 125 is received.

The output logic signal LS129 of the filter 129 is sent to a monostable multivibrator 131. A negative-going pulse signal having a narrow pulsewidth $t_s$ LS131 is generated by the monostable multivibrator 131 in synchronization with a time at which the logic signal LS129 of the filter 129 rises. The pulsewidth of the pulse signal LS131 corresponds to the time length ts. In addition, the logic signal LS129 is sent commonly to each stage of three stages of a shift register 133 as a clock signal for the shift operation thereof. The shift register 133 carries out a shift operation in synchronization with a time at which the logic signal LS129 rises.

A Q output signal Q127 of the latch circuit 127 is sent to a signal input terminal of a first stage m1 of the three stages of the shift register 133. A first stage m1 of the shift register 133 latches a logic level of the output signal Q127 of the latch circuit 127 in synchronization with the time at which the output signal LS129 of the filter 129 rises. Similarly, the second stage m2 and third stage m3 of the shift register 133 latch the logic states latched in their previous stages in synchronization with the time at which the logic signal LS129 rises. In other words, a logic level of the Q output signal of the latch circuit 127 at each time at which the logic signal LS129 rises is sequentially shifted and latched. Output signals D1, D2, and D3 which represent the output latch status in each stage of the shift register 133 appear in parallel and are sent as address specification data to a memory circuit 135 (e.g., ROM) in the control block 115. These output signals D3 through D1 are also sent to respective memory circuits 151, 165 in the transmission and reception blocks 117 and 119.

Each address of the memory circuit 135 is designated in a form of one of the combination patterns of "H" and "L" which appear during one period of the synchronous signal SYC based on the M-series code. Data G1 and G2 for controlling the serial data string transmission and reception are allocated to each corresponding address as illustrated in FIG. 6(*a*). A plurality of gate circuits for enabling and disabling data transmission and reception of the station according to the logic states of both data G1 and G2 are provided in the control block 115. A gate R 141 for enabling data reception is connected between an output terminal of the filter 125 and reception block 119. In addition, a gate T 143 is connected between the signal input/output line 121 and transmission block 117 for enabling the serial data string transmission from the transmission block 117.

As appreciated from FIGS. 6(*a*) and 6(*b*), both first and second control signals G1 and G2 are outputted from the memory circuit 135 to an AND gate 145. The output signal of a logical product of the AND gate 145 is in turn sent to a control input terminal of the gate T 143. On the other hand, the second control data signal G2 outputted from the memory circuit 135 is also sent via an inverter 147 to another AND gate 149. The output signal of a logical product of the AND gate 149 is in turn sent to a control input terminal of the gate R 141.

Next, the transmission block 117 comprises: the memory circuit 151 (for example, backed up RAM) for storing various data of a plurality of bits; a parallel-to-serial converter (hereinafter referred to as P/S converter) 153 which converts a parallel (bit parallel) data DP151 outputted from the memory circuit 151 into a serial (bit-serial) data DS153; a clock generator 155 which supplies the clock signal CLT (clock signal in synchronization with which the serial data is transmitted) having a predetermined period $T_{CLT}$ to the P/S converter 153; a modulator 157 which modulates the clock pulse signal CLT from the clock generator 155 in a pulse-width modulation mode in accordance with "High" and "Low" levels (corresponds to bits "1" and "0", respectively) of the serial data DS153 derived from the P/S converter 153. It should be noted that the period $T_{CLT}$ of each bit in the serial data string DS153 to be transmitted is extremely shorter than the period $t_c$ of the reference clock signal C for generating the synchronous code SYC in the synchronous code generator 113.

The memory circuit 151 receives the parallel output signals D1 through D3 of the shift register 133 as address data. When one address is specified by these output signals D1 through D3, the memory circuit 151 outputs a given serial data stored in the specified address.

On the other hand, the reception block 119 comprises: a demodulator 161 which demodulates the received data signal DT via the gate R141 to separate the signal DT into the clock signal CLR and serial data signal DR; a serial-to-parallel converter (S/P converter) 163 which converts the demodulated serial data signal DR into a parallel data signal DPR; and the memory circuit 165 (for example, RAM) for storing the parallel data signal DPR outputted from the S/P converter 163 in a specified address therein. It should be noted that a period $T_{CLR}$ of the demodulated clock signal CLR is the same as the period $T_{CLT}$ for each bit of the transmitted data.

The above-described memory circuits 151, 165 provided within the transmission and reception blocks 117, 119 are, for example, connected to a microcomputer (not shown).

The microcomputer writes a transmission data into the memory circuit 151 according to a condition of a controlled load and controls the load on the basis of data read from the memory circuit 165.

FIG. 9 shows signal timing charts for explaining a series of operations in the respective circuits in FIGS. 6(*a*), 6(*b*), and 7.

The reference clock signal C shown in (a) of FIG. 9 is the same as the shown in (a) of FIG. 8. In the same way, the M-series code signal M shown in (c) of FIG. 9 is the same as that previously shown in (b) of FIG. 8. A signal shown in (b) of FIG. 9 is the output signal LC225 of the monostable multivibrator 225 of the synchronous code generator 113 shown in FIG. 7. The logic signal LC225 is a signal which turns to a "0" only during the time $t_F$ as shown in (b) of FIG. 9.

As described above, both first and second oscillators 217, 219 oscillate at respective frequencies $f_1$ and $f_2$. When a logic status of the M-series code signal M outputted from the third stage m3 of the shift register 211 is at a "1", the first oscillator 217 is triggered to oscillate. When a logic status of the M series code signal M outputted from the third stage m3 of the shift register 211 is at a "0", the second oscillator 219 is, in turn, triggered to oscillate.

As shown in (c) of FIG. 9, the M-series code signal M indicates "1110010" during one period T and the logic status is repeated cyclically. The AND gate 223 which takes an logical AND between the oscillated output signal having the frequency of either $f_1$ or $f_2$ oscillated according to the logic status of such M-series code signal M and the output logic signal LC225 (refer to (b) of FIG. 9) of the monostable multivibrator 225. In addition, the signal shown in (e) of FIG. 9 is the modulated data signal SD having both frequency components $f_1$ and $f_2$ in which both signals of synchronous signal (SYC) and serial data string (DT) are intermixed on the signal transmission line 111.

In this embodiment, the serial data, i.e., modulated data signal SD shown in (e) of FIG. 9 has four bits within one interval (time slot) defined by the reference clock signal C. Both such a serial data string (DT) and the synchronous signal (SYC) transmitted from the synchronous code generator 113 are transferred on the common signal transmission line 111. In other words, both serial data string DT to be transmitted and received and synchronous signal SYC sent from the synchronous code generator 113 are superposed on the common signal transmission line 111. Since both wide ($t_H$) and narrow ($t_L$) pulses constituting the serial data are present together with the synchronous signal SYC having the frequency of either $f_1$ or $f_2$, the signal consequently takes a form as shown in (e) of FIG. 9. Such a signal waveform as shown in (e) of FIG. 9 is called the above-mentioned modulated data SD. The above-described frequency comparator 123 outputs a signal represented by either "1" or "0" according to the inputted signal frequency. The operation will be described with reference to each time $t_1$ through $t_7$ at which the clock pulse of the period tc rises. That is to say, the frequency of the synchronous signal SYC at times between $t_1$ and $t_2$ $[t_1, t_2]$, between $t_2$ and $t_3$ $[t_2, t_3]$, between $t_3$ and $t_4$ $[t_3, t_4]$, and between $t_6$ and $t_7$ is $f_1$. On the other hand, the frequency of the synchronous signal SYC at the times $[t_4, t_5]$, $[t_5, t_6]$, and $[t_7, t_1]$ is $f_2$ ($<f_1$).

The modulated data signal SD in which the synchronous signal SYC the frequency of which changes is present is introduced from the signal transmission line 111 to the frequency comparator 123. When the synchronous signal SYC has the frequency of $f_1$, the logic output signal LS123 has a logic level of a "0". When the synchronous signal has the frequency of $f_2$, the logic output signal LS123 has another logic level of a "1". The signal LS123 is introduced into the latch circuit 127 via the D input terminal thereof.

On the other hand, the modulated data signal SD is introduced from the common signal transmission line 111 to the filter 125 via the signal input/output line 121 of the control block 115. The modulated data signal SD includes four bits of serial data within one time slot as described above. A period of one bit is defined as $t_B$ in the serial data. A bit data represented by "1" is the wide pulse form $t_H$. A bit data represented by "0" is the narrow pulse form $t_L$. Each bit pulse of the modulated data signal SD is modulated by the frequency $f_1$ when the frequency of the synchronous signal SYC is $f_1$ and is modulated by the frequency $f_2$ when the signal SYC is $f_2$ as appreciated from (e) of FIG. 9.

It should be noted that since the network system according to the invention operates when both serial data (DT) and synchronous signal (SYC) are present on the common signal transmission line 111, a power-on sequence is initiated before the actual transmission and reception of the serial data between each station. For example, when a power is turned on, the gates T 143, R 141 of any of the stations are closed (disconnected from the line 121). At this time, the synchronous signal as shown in (d) of FIG. 9 only appears on the common signal transmission line 111 without modulation with the serial data signal DT since the signal transmission line 111 is connected with a bias supply (not shown) via the pull-up resistor in the circuit 227 shown in FIG. 7. Therefore, these gates T 143, R 141 are so constructed as to take a logical AND with the synchronous code generator 113 via the signal transmission line 111 when either of the gates T 143, R 141 is open (connected to the line 111).

Suppose that a serial bit status of the four-bit serial bit is (0, 1, 0, 0) at the time slot between $t_2$ and $t_3$ $[t_2, t_3]$, a serial bit status of the four-bit serial data is (1, 1, 0, 1) at the time slot between $t_3$ and $t_4$ $[t_3, t_4]$, and a bit status of the serial data is (1, 0, 0, 1) at the time slot between $t_4$ and $t_5$ $[t_4, t_5]$. The serial data of such bit status is moved on the signal transmission line 111 as the modulated data signal SD. The filter 125 outputs the serial data string as shown in (g) of FIG. 9, when the serial data string DT is sent on the line 111. Furthermore, the serial data string signal S125 is then sent to the subsequent filter 129 wherein the output signal LS129 thereof whose frequency components higher than $1/(t_B-t_L)$ are cut off. The output signal LS129 is a wide pulse form shown in (i) of FIG. 9 and has a width according to a data bit status within each time slot since the filter 129 comprises the retriggerable monostable multivibrator as described above. The signal LS129 is then sent to the monostable multivibrator 131. The monostable multivibrator 131 outputs the negative-going narrow pulse signal LS131 which turns to a "0" only during the time $t_s$ on the rising edge of the signal LS129 (times $t_{1a}$, $t_{2a}$, $t_{3a}$, . . . ) to the clock terminal of the latch circuit 127. In addition, the signal LS129 is commonly inputted to the clock terminal of each of three stages of the shift register 133.

The latch circuit 127 latches the logic status of the logic signal LS123 received at the D input terminal of the latch circuit 127 in response to each rising edge of the signal LS131 (times: $t_{1a}+t_s$; $t_{2a}+t_s$; $t_{3a}+t_s$, . . . ).

The Q output signal Q127 is shifted in the shift register 133 sequentially in response to each falling edge of the signal LS129 (times: $t_{1b}$, $t_{2b}$, $t_{3b}$, . . . ). In this way, the logic status of the synchronous signal SYC included in the modulated data signal SD transmitted via the signal transmission line 111 is sequentially registered in the shift register 133. The parallel output signals D3 through D1 are the address data as described above (refer to (f) of FIG. 9). That is to say, the address data indicates (1, 0, 1) with respect to the time $t_{1b}$ of the falling edge of the logic signal LS129 outputted from the filter 129 during the time slot from $t_2$ to $t_3$. The address AD at the time $[t_{1b}, t_{2b}]$ indicates (0, 1, 1). The address AD at the time $[t_{1b}, t_{3b}]$ indicates (1, 1, 1). These are appreciated from (f) of FIG. 9. Furthermore, the address AD indicates (1, 1, 0) after the time $t_{3b}$.

Since the address data AD at the time $[t_2, t_3]$ indicates (1, 0, 1), the memory circuit 135 of the control block 115 outputs the first control data signal G1 and second control data signal G2 with the logic status of both "1"s (refer to (l) and (m) of FIG. 9). Since the output signal LS149 of the logical product of the AND gate 149 is at a "0" due to the inverter 147 and the gate R 141 is not open, the station does not enter the data received mode. On the other hand, since the output logic product signal LS145 of the AND gate 145 is at a "1", the gate T 143 is open so that the station is enabled to transmit the data.

In this case, a data stored in a specified area of the memory circuit 151 within the transmission block 111 whose address is specified by the address data (1, 0, 1) is outputted in the form of a parallel data DP151. Suppose that the data stored in the specified area of the memory circuit 151 within the transmission block 111 whose address is specified by the address data (1, 0, 1) is outputted in the parallel form of (0, 1, 0, 0). The parallel-form data DP151 is sent to the P/S converter 153 in the parallel form. The P/S converter 153 converts the parallel-form data DP151 into the serial-form data DS153 in synchronization with the clock signal CLT. The serial data signal DS153 after the parallel-to-serial conversion is modulated in the pulsewidth modulation mode in accordance with the clock signal CLT.

The data signal DT (refer to (h) of FIG. 9) of the serial data (1, 0, 0, 1) present serially with respect to time in which a wider pulse represents "1" and narrower pulse represents "0" is outputted via the gate T 143 to the signal transmission line 111.

In this way, after the four-bit serial data D is outputted, the shift register 133 carries out shift operations at the time $t_{1b}$ at which the logic signal LS129 falls. Therefore, since the logic state of the M-series code signal M is at a "1" during the times between $t_2$ and $t_3$ $[t_2, t_3]$, the address data (D3, D2, D1) held in the shift register 133 in turn indicates (0, 1, 1). In this way, the address data for the next time slot is registered in the shift register 133.

In the similar way, since the logic status of the M-series code signal M within the time slot $[t_3, t_4]$ is at a "1" and the frequency of the synchronous signal SYC within the time slot between $t_3$ and $t_4$ is $f_1$, the logic status of the Q output signal Q127 remains at a "1" due to the rising of the output signal SL131 of the monostable multivibrator 131. Since the shift register 133 shifts at the time $t_{2b}$ at which the output logic signal LS129 of the filter 129 falls, the output signals D3 through D1 indicate (1, 1, 1). Therefore, the address data AD is determined as (1, 1, 1) at the next time slot $[t_4, t_5]$.

Since the address adat AD in the next time slot $[t_3, t_4]$ indicates (0, 1, 1), only the first control data signal G1 from the memory circuit 153 of the control block 115 indicates "0" and the other second control data signal G2 from the memory circuit 153 of the control block 115 indicates a high impedance state (*). Since both two AND gates 145, 149 output low logic levels of the logic signals LS145 and LS149, respectively, both gates T143 and T149 are closed. Therefore, neither transmission nor reception of the serial data DT is carried out.

Furthermore, since the address data AD indicates (1, 1, 1) during the time slot $[t_4, t_5]$, the first control data signal G1 from the memory circuit 135 indicates "1"

and second control data signal G2 from the memory circuit 135 indicates "0". Since the logic output signal LS145 of the AND gate 145 is turned to a "0", the gate T143 is closed so that the transmission block 117 is disconnected from the signal input/output line 121. Since the logic output signal LS149 of the other AND gate 149 is at a "1" during that time slot, the gate R141 is, in turn, open. Therefore, the station does not perform the transmission of data but perform only the reception of data (The reception block 119 only is connected to the signal input/output line 121.)

The serial data string D in the time slot between $t_4$ and $t_5$ [$t_4$, $t_5$] indicates (1, 0, 0, 1) as shown in (h) of FIG. 9. The data indicating the serial data string D is sent from the signal transmission line 111 to the reception block 119 via the gate R 141. In this case, since the actual data in the signal transmission line 111 is the modulated data signal SD as shown in (e) of FIG. 9, the actual data is sent to the filter 129 via the signal input-/output line 121 in the control block 115 and thereafter is sent to the gate R 141 in the form of a signal S125 (serial data string signal). Since the gate R 141 is open with the first control data signal G1 at a "1" and second control data signal G2 at a "0", the serial data string signal S125 sent to the gate R 141 is introduced to the reception block 119. In this way, since the serial data (1, 0, 0, 1) sequentially inputted to the demodulator 161 is demodulated in the pulsewidth modulation mode, the received data DR the logic status of which indicates "1001" is converted in a parallel data DPR by means of the S/P converter 163 in synchronization with the clock pulse CLR. At this time, since the memory circuit 165 receives the address data (1, 1, 1) from the shift register 133, the received data is stored in the memory area corresponding to the address specified by (1, 1, 1).

As described above, the data reception is made when the address data indicates (1, 1, 1) in the station shown in FIGS. 6(*a*) and 6(*b*) and the data transmission is made when the address data indicates either (1, 0, 1) or (1, 1, 0). On the other hand, when in one of the other stations except that shown in FIGS. 6(*a*) and 6(*b*) each memory circuit 135, 151, 165 is set such that the data transmission therefrom to the station shown in FIGS. 6(*a*) and 6(*b*) is made when the address indicates (1, 1, 1) and the data reception is made when the address indicates either (1, 0, 1) or (1, 1, 0), that station can be synchronized with the station shown in FIGS. 6(*a*) and 6(*b*) so that data transmission and reception between these stations are made possible.

In addition, in the station shown in FIGS. 6(*a*) and 6(*b*), the data is set in the memory circuit 131 so that the data reception is made, e.g., when the other address indicates (0, 0, 1) and the data transmission is made, e.g., when the address indicates (0, 1, 0). On the other hand, if in one of the stations other than the station described above and shown in FIGS. 6(*a*) and 6(*b*), the data transmission is made when the address indicates (0, 0, 1) and data reception is made when the address indicates (0, 1, 0). The data transmission and reception between these stations are made possible. In this way, the station shown in FIGS. 6(*a*) and 6(*b*) can separately transmit and receive a predetermined data to and from the other two stations without collision of data.

Therefore, as described above, the addressing becomes possible taking the synchronization with the synchronous signal SYC if the setting of data transmission and reception is made for the address common to the stations between which the data is transferred in the other stations.

Furthermore, data transmission and reception are made possible when the plurality of different data in one station are transmitted and received to and from the other plurality of stations.

If any one of the stations which is used only for data transmission, the reception block 119 may be eliminated. In addition, if any one of the stations which is used only for data reception, the transmission block 117 may be eliminated. As described above, the synchronous code can be transmitted and received with a single signal transmission line together with the serial data during the transfer of data via the common signal transmission line.

As described above, the synchronous code can be transmitted from the synchronous code generator 113 to each station via the line 111 together with the serial data. In addition, since the M-series periodic code is used, it is possible to check the sequence of the synchronous code by means of the polynomial expression.

Although the M-series code is used as the synchronous code, there are other time series codes having periodicity. However, since generation polynomial expressions are complex as compared with that in the M-series code and they cannot be achieved with such simple shift register and Exclusive OR gate used in this embodiment, the specific circuit cannot be achieved. In addition, the M-series code signal M is modulated into the signal having two frequencies $f_1$ and $f_2$ so that such a monostable multivibrator 225 (refer to FIG. 7) is provided which turns to a "0" during the time length $t_F$ in order to distinguish the two frequencies $f_1$ and $f_2$. Each time slot can be identified even when the logic level of the M-series code maintaines the same level. However, since each time slot is occupied only by the time $t_F$, the transmission speed is accordingly reduced.

As an example for eliminating such defects, another oscillator having an oscillation frequency $f_3$ ($\neq f_1$, $\neq f_2$) for identifying each time slot is prepared. For example, when the code string continues as (1, 1, 1, 0, 0, 1, 0, 1, 1), the frequency modulation may be carried out as ($f_1$, $f_3$, $f_1$, $f_2$, $f_3$, $f_1$, $f_2$, $f_1$, $f_3$) using the frequency $f_3$ in the case when the same logic level code continues. In this case, the synchronous code generator needs to have a circuit in which the code level $M_i$ can be stored during each time of the code generation $t_i$ specified by the reference clock. When the current code level $M_i$ is compared with the previous code level $M_{i-1}$ for each clock, the signal having the frequency of $f_3$ is generated if the compared result is the same level and the signal having the frequency of either $f_1$ ("1") or $f_2$ ("0") is generated according to the current code level if the compared result is different. If the signal having the frequency of $f_3$ is received in an address identification block, i.e., the control block 115 of each station, the frequency comparator 123 shown in FIGS. 6(*a*) and 6(*b*) may be constructed so as to output the same logic level as that at the previous clock time.

In this embodiment, a plurality of oscillators are used to carry out a frequency modulation of the M-series code signal M. However, a single voltage-controlled oscillator may be used to change the oscillation frequency depending on a voltage level of the input signal thereof.

As described hereinabove, since according to the present invention, both a transmission control signal whose frequency is changed according to each bit information based on such a time series code and serial data string signal to be transmitted and received are superposed with the synchronous signal SYC on a single common transmission line 111 so that data transfer can be made between each station and a simply constructed and inexpensive network system can be achieved.

It will clearly be understood by those skilled in the art that the foregoing description is made in terms of the preferred embodiment and various changes and modifications may be made without departing from the scope and spirit of the present invention, which is to be defined by the appended claims.

What is claimed is:

1. A network system, comprising:

(a) a single-wire common signal transmission line for transferring a serial bit data string between a pluality of data stations connected thereto;

(b) first means for generating a synchronization signal and for repeatedly generating an address information bit signal based on a predetermined time series code for each of predetermined synchronization timings in the predetermined time series code, modulating each address information bit signal into a synchronization signal having a frequency which is varied according to a bit status of each address information bit signal, and outputting the modulated synchronization signal to the common signal transmission line so as to superpose on the serial bit data string;

(c) second means provided within each station for demodulating the synchronization signal derived from said first means according to the frequency thereof so as to extract the bit status of the address information bit signal;

(d) third means provided within each station for reproducing a signal corresponding to the predetermined time series code generated in said first means on the basis of the extracted bit status of the address information bit signal;

(e) fourth means for discriminating each bit combination pattern of a predetermined data length from the reproduced signal of said third means; and (f) fifth means for determining an operation mode of the station on the basis of each bit combination pattern discriminated by said fourth means.

2. The network system according to claim 1, wherein said fifth means determines the transmission of the serial data bit string from the station when one of the bit combination patterns discriminated by said fourth means coincides with a predetermined bit combination pattern.

3. The network system according to claim 1, wherein the operation mode of the station has three modes of a serial data bit string transmission mode, a serial data bit string reception mode, and a serial data bit string transmission/reception disabled mode.

4. The network system according to claim 3, which further comprises sixth means for transmitting a plurality of bit data stored therein in a bit serial manner within each predetermined synchronization timing when said fifth means determines the transmission mode to another station in which said fifth means determines the reception mode, an address storing the plurality of bit data being specified by one of the bit combination patterns on the basis of which said fifth means determines the transmission mode.

5. The network system according to claim 4, which further comprises seventh means for receiving a plurality of bit data in a bit serial manner within each predetermining synchronization timing when said fifth means determines the reception mode from the other station in which said fifth means determines the transmission mode, and address for storing the transmitted bit data being specified by one of the bit combination patterns on the basis of which said fifth means determines the reception mode.

6. The network system according to claim 1, wherein said first means comprises: a third-order M-series code generating means in synchronization with a reference clock signal having a constant period; a monostable multivibration for generating a pulse having a predetermined pulsewidth; two oscillators both of which generate two respective signals having different oscillation frequencies in response to the bit status of the third order M-series code signal; and an AND gate which takes logical AND between the output signals of said monostable multivibrator and either of the two oscillators.

7. The network system according to claim 6, wherein said second means comprises a frequency comparator which outputs a different-level logic signal according to the frequency of the synchronous signal.

8. The network system according to claim 7, wherein said third means comprises a D type flip-flop circuit a D input terminal of which is connected to said frequency comparator and a three-stage of shift register connected to said D type flip-flop for reproducing the third-order M-series code signal.

9. The network system according to claim 1, wherein the transmission signal line transfers only the synchronous signal outputted from said first means when no serial bit data string is present.

* * * * *